(12) United States Patent
Dai

(10) Patent No.: US 7,969,725 B2
(45) Date of Patent: Jun. 28, 2011

(54) FIXING MECHANISM FOR ELECTRONIC DEVICE

(75) Inventor: Bin Dai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 23 days.

(21) Appl. No.: 12/508,587

(22) Filed: Jul. 24, 2009

(65) Prior Publication Data

US 2010/0246156 A1    Sep. 30, 2010

(30) Foreign Application Priority Data

Mar. 27, 2009   (CN) .......................... 2009 1 0301194

(51) Int. Cl.
H05K 5/00 (2006.01)
H05K 7/00 (2006.01)
H01R 13/66 (2006.01)
H01R 15/62 (2006.01)

(52) U.S. Cl. .......... 361/679.37; 361/679.33; 361/679.34; 361/679.35; 361/679.36; 361/679.38; 312/332.1; 312/333; 439/327; 439/328; 439/151

(58) Field of Classification Search .. 361/679.31–679.4, 361/679.55–679.6, 724–727; 439/60, 151–160, 439/327, 328, 331; 312/332.1, 333
See application file for complete search history.

(56) References Cited

U.S. PATENT DOCUMENTS

| 7,575,453 | B2 * | 8/2009 | Lee et al. ...................... 439/159 |
| 7,808,778 | B2 * | 10/2010 | Hsu .......................... 361/679.38 |
| 2006/0187630 | A1 * | 8/2006 | Knappich et al. ............ 361/684 |

* cited by examiner

*Primary Examiner* — Robert J Hoffberg
*Assistant Examiner* — Jerry Wu
(74) *Attorney, Agent, or Firm* — Frank R. Niranjan

(57) ABSTRACT

A fixing mechanism fixing a storage device to a bracket includes a fastening member. The fastening member is fixed to the storage device, and has a first connecting hook and a second connecting hook. A first latching portion and a second latching portion are formed on the bracket. The first latching portion defines an engaging groove. The first connecting hook is elastic and engaged in the engaging groove of the first latching portion. The second connecting hook engages the second latching portion.

18 Claims, 6 Drawing Sheets

FIXING MECHANISM FOR ELECTRONIC DEVICE

BACKGROUND

1. Technical Field

The present disclosure relates to fixing mechanisms, and particularly, to a fixing mechanism for an electronic device with a storage device.

2. Description of Related Art

Electronic devices, such as a desktop computer, or a server, usually include storage devices, such as hard disk drives, read/write digital video disc (DVD) drives, etc. These storage devices are commonly added to increase the functionality of the electronic device as desired.

A storage device may be mounted on an electronic device by a fixing mechanism. The fixing mechanism includes a storage device holder and associated fixing bracket and fasteners. Because installing and uninstalling the storage device from the electronic device is done in the housing of the electronic device, these processes can be tedious and troublesome. Further, with development in the electronics industry, many electronic devices are required to have a relatively thin profile. Therefore, the risk of damaging other working elements of the electronic device during the installing and uninstalling the storage device increases.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
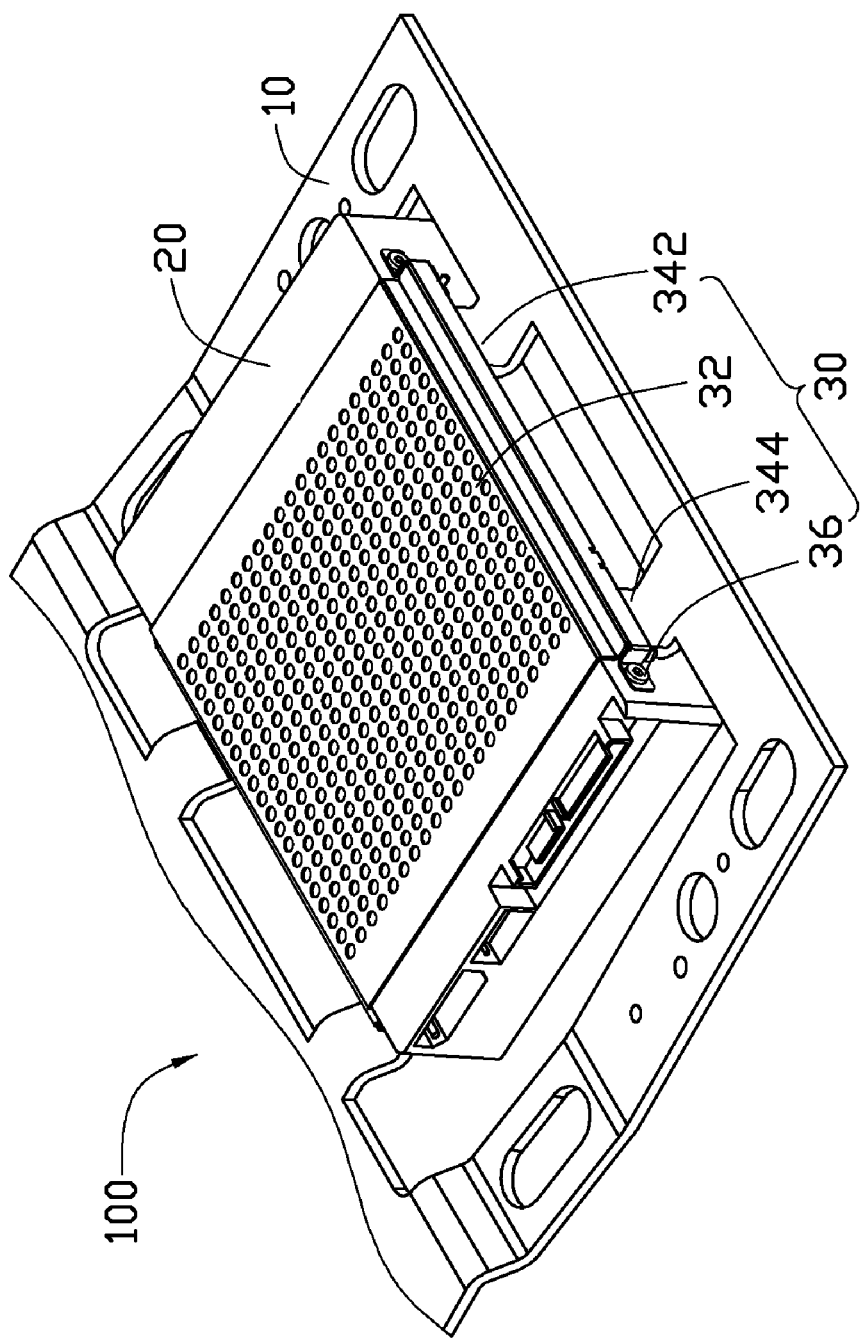
FIG. 1 is a partial, isometric view of an embodiment of a fixing mechanism used in an electronic device.

Referring to FIG. 1, an embodiment of an electronic device 100 includes a bracket 10, a storage device 20, and a fixing mechanism 30 to fix the storage device 20 to the bracket 10. In the illustrated embodiment, the electronic device 100 is a host computer, but can be any device having a storage device such as a television set, handheld game console, or other.

Figure 2:
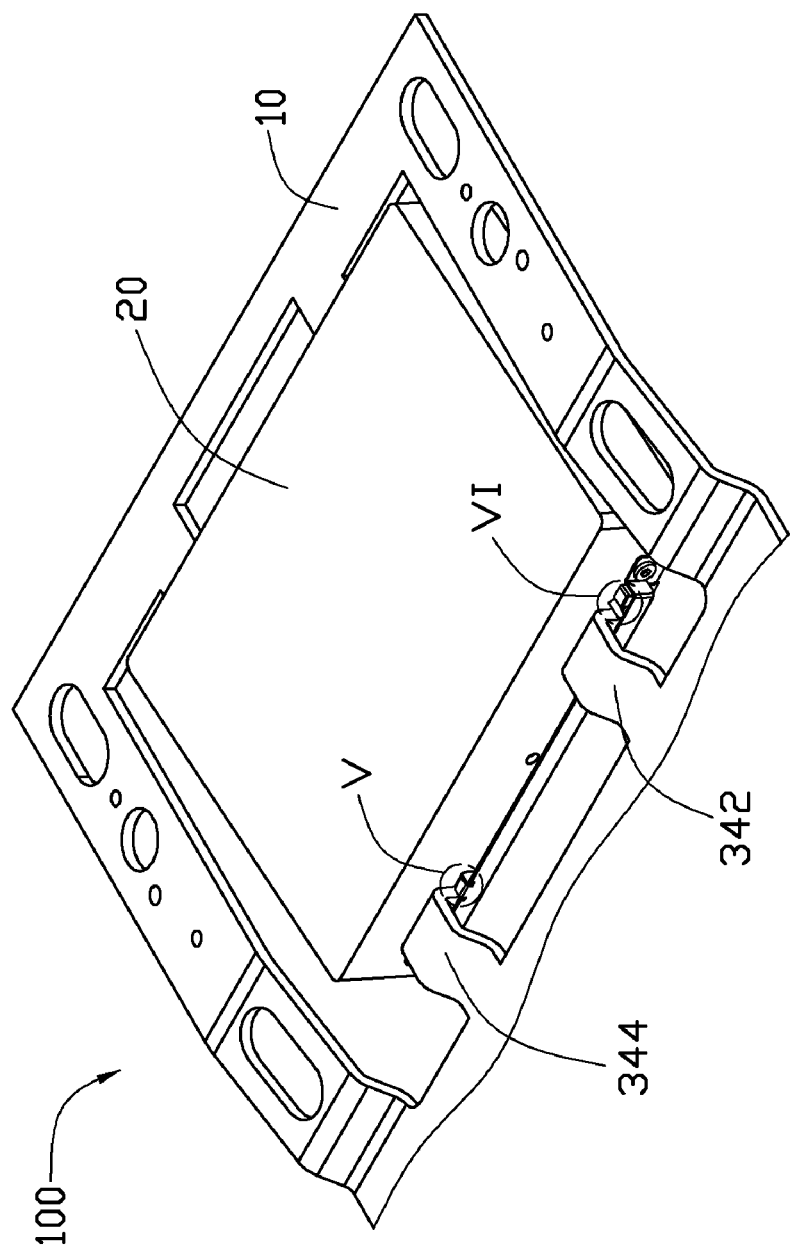
FIG. 2 is similar to FIG. 1, but viewed from another aspect.
Figure 3:
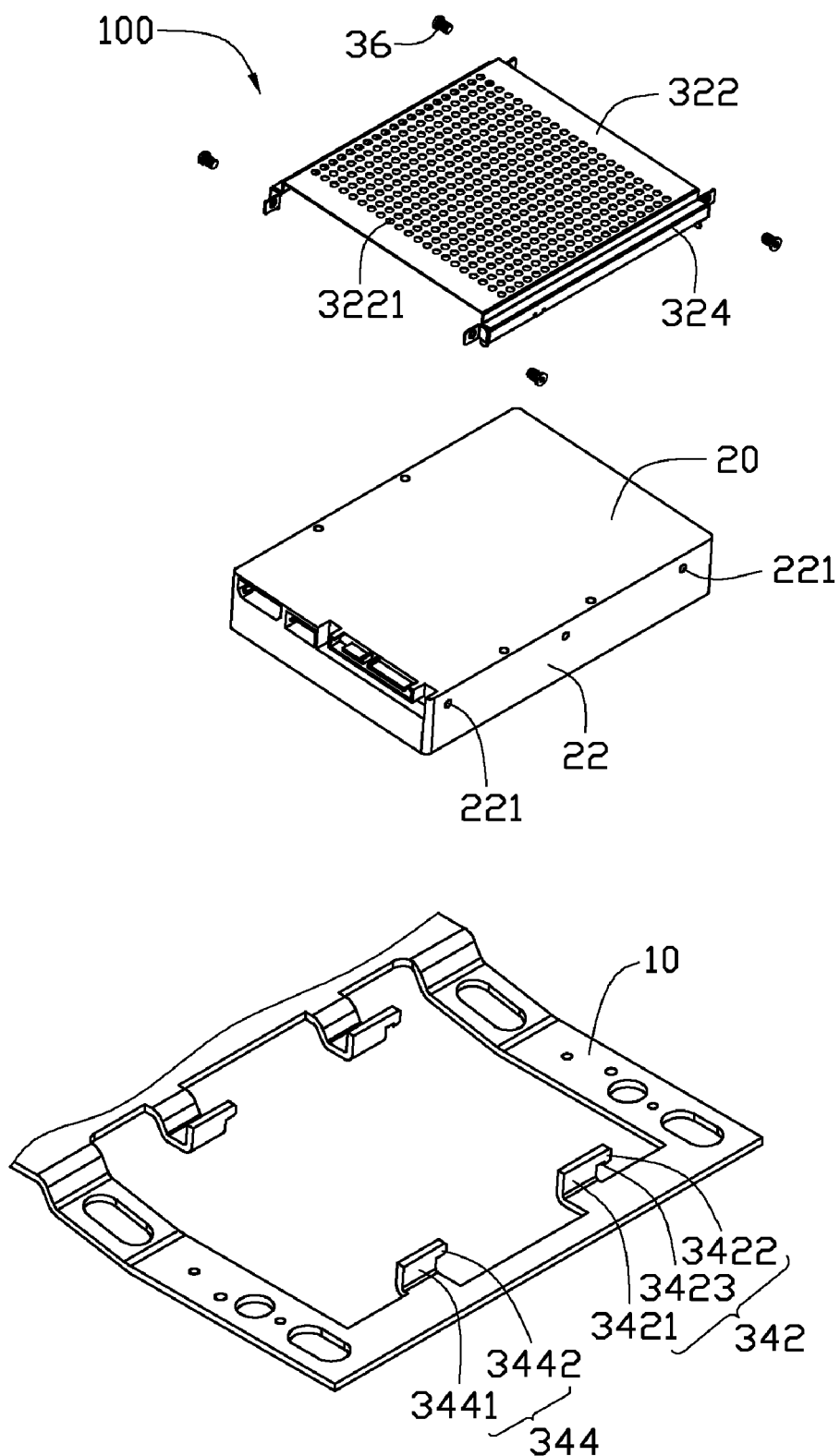
FIG. 3 is an exploded, isometric viewed of the electronic device of FIG. 1

Further referring to FIGS. 2 and 3, the storage device 20 may be a hard-disk drive, substantially cubic and including two positioning sides 22 opposite to each other. Each of the positioning sides 22 defines a pair of fixing holes 221, also opposite to each other.

The fixing mechanism 30 includes a fastening member 32, two first latching portions 342, two second latching portions 344, and a plurality of fasteners 36. The first latching portions 342 and the second latching portion 344 are formed on the bracket 10. The fasteners 36 are configured to fasten the fastening member 32 to the storage device 20.

Figure 4:
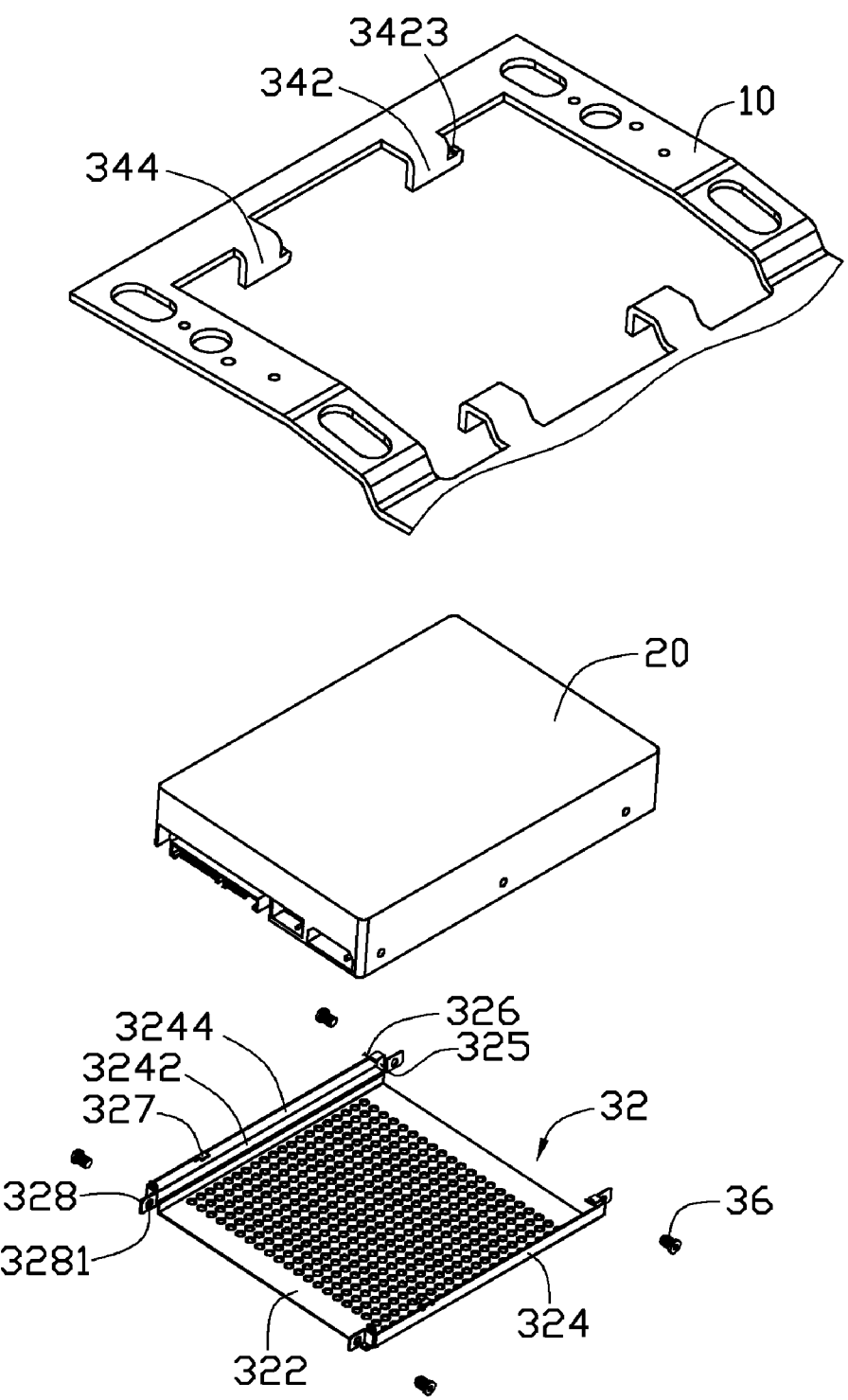
FIG. 4 is similar to FIG. 3, but viewed from another aspect.

Referring to FIG. 4, the fastening member 32 is substantially U-shaped. The fastening member 32 includes a base plate 322 and a pair of positioning portions 324 extending substantially perpendicularly from opposite sides of the base plate 322. The base plate 322 defines a plurality of through holes 3221 for heat dissipation. Each positioning portion 324 is a stepped portion, and includes a first sidewall 3244 and a second sidewall 3242 formed on the first sidewall 3244. Two restricting portions 325 are formed on opposite ends of each positioning portion 324. A connecting portion 328 is formed on each restricting portion 325, and defines a connecting hole 3281.

Figure 6:
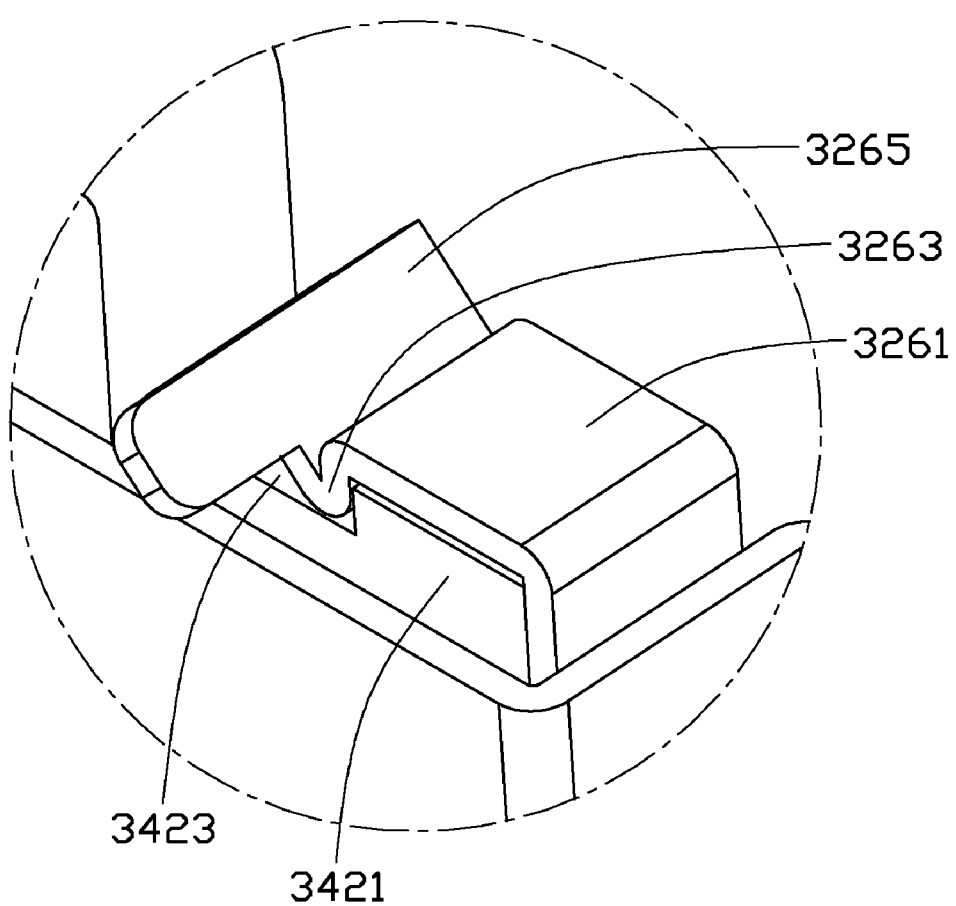
FIG. 6 is an enlarged, isometric view of the part VI of FIG. 2.

A first connecting hook 326 is formed on each restricting portion 325. A second connecting hook 327 is formed on each first sidewall 3244. The first connecting hook 326 can be elastically deformed. In the illustrated embodiment, the first connecting hook 326 includes an elastic portion 3261, a hook portion 3263 and an operating portion 3265 (as shown in FIG. 6). Opposite ends of the hook portion 3263 are respectively connected to the elastic portion 3261 and the operating portion 3265.

Each first latching portions 342 includes a main plate 3421 extending substantially perpendicular from an inner edge of the bracket 10, and an engaging portion 3422 extending from a side of the main plate 3421. The engaging portion 3422 defines an engaging groove 3423 for receiving the hook portion 3263 of the first connecting hook 326. Each second latching portion 344 is substantially aligned with and adjacent to the first latching portion 342. The second latching portion 344 includes a main portion 3441 extending substantially perpendicular from an inner edge of the bracket 10, and an engaging portion 3442 extending from a side of the main portion 3441. An extending direction of the engaging portion 3442 is the same as that of the engaging portion 3422. The second latching portion 344 is configured to engage the second connecting hook 327.

Figure 5:
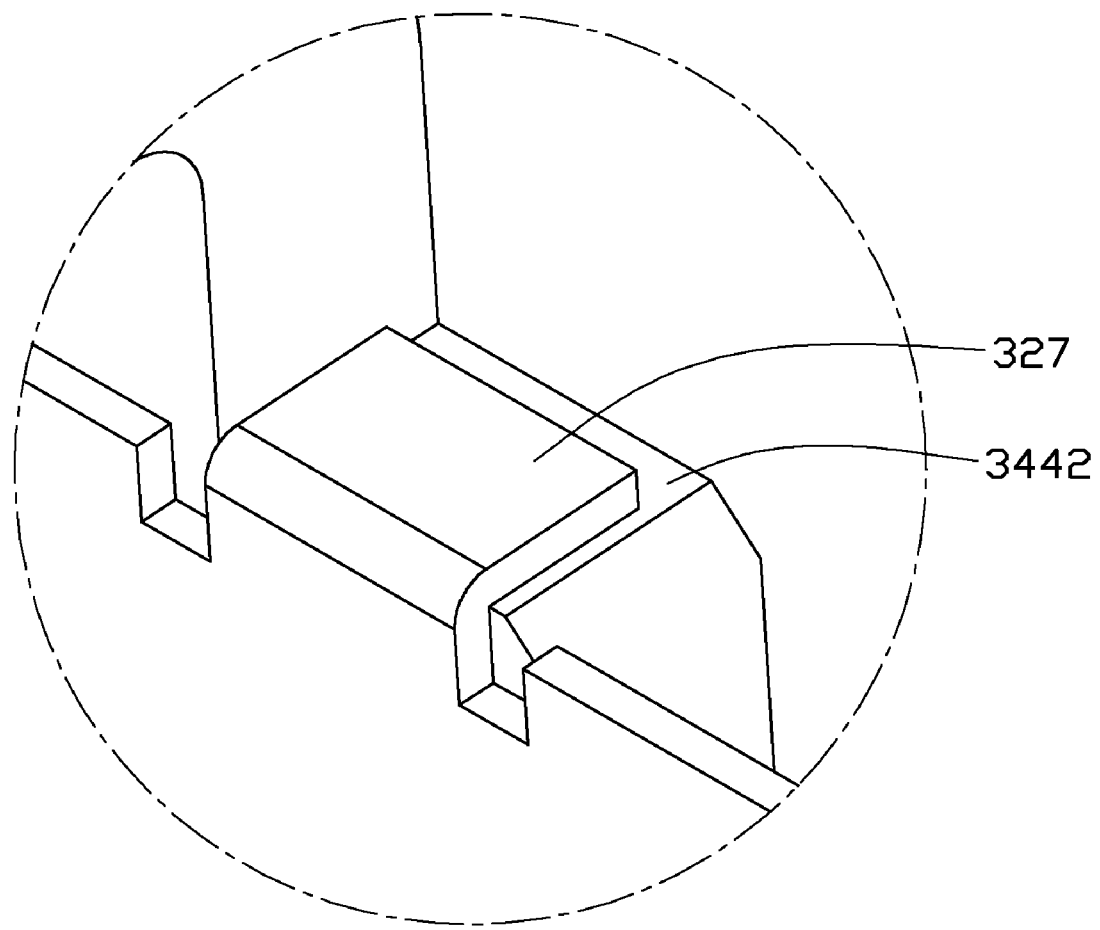
FIG. 5 is an enlarged, isometric view of the part V of FIG. 2.

Further referring to FIGS. 5 and 6, during assembly of the electronic device 100, the fasteners 36 pass through the connecting holes 3281 of the connecting portions 328, and engage the fixing holes 221 of the storage device 20 correspondingly, to fix the storage device 20 between the positioning portions 324 of the fastening member 32. The storage device 20 and the fastening member 32 are positioned on the bracket 10, with the first connecting hooks 326 at a side of the first latching portions 342, and the second connecting hooks 327 at a side of the second latching portions 344. When force is applied on the fastening member 32 opposite to the extending direction of the engaging portions 3442, the first connecting hooks 326 engage the engaging groove 3423 of the first latching portions 342, and the second connecting hooks 327 engage the second latching portions 344. Thus, the storage device 20 is fixed on the bracket 10.

The storage device 20 can be detached from the bracket 10 as follows. When operating portions 3265 are pulled, the elastic portions 3261 of the first connecting hooks 326 deform and the fastening member 32 is moved relative to the bracket 10 along the extending direction of the engaging portions 3442, until the first connecting hooks 326 disengage from the first latching portions 342, and the second connecting hooks 327 disengage from the second latching portions 344. The storage device 20 together with the fastening member 32 is withdrawn from the bracket 10.

Elastic portions 3261 included in first connecting hooks 326 can deform during assembly/disassembly, such that first connecting hooks 326 can engage/disengage from the engaging grooves 3423 of the first latching portions 342. Therefore, the electronic device 100 is easily assembled/disassembled, and has a simple structure. In addition, the first connecting hooks 326 engage the first latching portions 34 to horizontally fix the storage device 20 to the bracket 10, and the second connecting hooks 327 engage the second latching portions 344 to vertically fix the storage device 20 to the bracket 10. Thus, the storage device 20 can be firmly fixed to the bracket 10.

It should be pointed out that the fastening member 32 may be fixed on the bracket 10, wherein first latching portions 342 and the second latching portions 344 are formed on the storage device 20. The fastening member 32 may only include the first connecting hooks 326 and the second connecting hooks 327 positioned on the storage device 20. The fastening member 32 may be fixed to the storage device 20 via other means, such as welding. In addition, the fastening member 32 may include three or more first connecting hooks 326 and three or more second connecting hooks 327. Correspondingly, the bracket 10 includes three or more first latching portions 342 and three or more second latching portions 344, enhancing bonding strength of the bracket 10 and the fastening member 32.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A fixing mechanism fixing a storage device to a bracket, comprising:
    a fastening member fixed to one of the storage device and the bracket, the fastening member comprising a first connecting hook and a second connecting hook; and
    a first latching portion and a second latching portion formed on the other of the storage device and the bracket respectively corresponding to the first and second connecting hooks, the first latching portion is step shaped, the step shaped defining an engaging groove;
    wherein the first connecting hook is elastic and horizontally engaged in the engaging groove of the first latching portion along a direction parallel to the bracket, and the second connecting hook vertically engages the second latching portion, thus fixing the storage device of an electronic device between the fastening member and the bracket.

2. The fixing mechanism of claim 1, wherein the fastening member comprises a base plate and a pair of positioning portions extending substantially perpendicularly from opposite sides of the base plate; and the storage device is positioned between the pair of positioning portions.

3. The fixing mechanism of claim 2, wherein the base plate defines a plurality of through holes for heat dissipation.

4. The fixing mechanism of claim 2, wherein each positioning portion of the pair of positioning portions comprises a first sidewall and a second sidewall formed on the first sidewall; two restricting portions formed on one end of the each positioning portion; and wherein the first connecting hook is formed on each of the two restricting portions, and the second connecting hook is formed on the first sidewall.

5. The fixing mechanism of claim 1, wherein a plurality of connecting portions are formed on the fastening member and fixed to the storage device.

6. The fixing mechanism of claim 1, wherein the first connecting hook comprises an elastic portion, a hook portion, and an operating portion, and the hook portion connects the elastic portion to the operating portion.

7. The fixing mechanism of claim 6, wherein the first latching portion comprise a main plate extending substantially perpendicular from the bracket, and a first engaging portion extending from a side of the main plate; wherein the engaging groove is defined in the first engaging portion and the hook portion is engaged in the engaging groove.

8. The fixing mechanism of claim 7, wherein the second latching portion comprises a main portion extending substantially perpendicular from the bracket, and a second engaging portion extends from a side of the main portion and the second connecting hook engages the second engaging portion.

9. The housing of claim 1, wherein the second latching portion is substantially aligned with and adjacent to the first latching portion.

10. A fixing mechanism for an electronic device, comprising:
    a fastening member comprising a first connecting hook and a second connecting hook; and
    a bracket comprising a first latching portion and a second latching portion respectively corresponding to the first and second connecting hooks, the first latching portion is step shaped, the step shaped defining an engaging groove;
    wherein the first connecting hook is elastic and horizontally engages in the engaging groove of the first latching portion along a direction parallel to the bracket, and the second connecting hook vertically engages the second latching portion, thus fixing a storage device of the electronic device between the fastening member and the bracket.

11. The fixing mechanism of claim 10, wherein the fastening member comprises a base plate and a pair of positioning portions extending substantially perpendicularly from opposite sides of the base plate; wherein the storage device is positioned between the pair of positioning portions.

12. The fixing mechanism of claim 11, wherein the base plate defines a plurality of through holes for heat dissipation.

13. The fixing mechanism of claim 11, wherein each of the pair of positioning portions comprises a first sidewall and a second sidewall formed on the first sidewall; two restricting portions are formed on one end of the each of the pair of positioning portion; the first connecting hook is formed on each of the two restricting portions, and the second connecting hook is formed on the first sidewall.

14. The fixing mechanism of claim 10, wherein a plurality of connecting portions are formed on the fastening member, and the plurality of connecting portions are fixed to the storage device.

15. The fixing mechanism of claim 10, wherein the first connecting hook comprises an elastic portion, a hook portion, and an operating portion, wherein the hook portion connects the elastic portion to the operating portion.

16. The fixing mechanism of claim 15, wherein the first latching portion comprises a main plate extending substantially perpendicular from the bracket, and a first engaging portion extending from a side of the main plate; wherein the engaging groove is defined in the first engaging portion, and the hook portion is engaged in the engaging groove.

17. The fixing mechanism of claim 16, wherein the second latching portion comprises a main portion extending substantially perpendicular from the bracket, and a second engaging portion extending from a side of the main portion.

18. The housing of claim 10, wherein the second latching portion is substantially aligned with and adjacent to the first latching portion.

\* \* \* \* \*